United States Patent [19]
Adams

[11] 3,768,821
[45] Oct. 30, 1973

[54] SPLIT TORQUE DRIVETRAIN FOR MULTIPLE WHEEL VEHICLE

[75] Inventor: Dale C. Adams, Livonia, Mich.

[73] Assignee: Ford Motor Company, Dearborn, Mich.

[22] Filed: Apr. 4, 1972

[21] Appl. No.: 240,936

[52] U.S. Cl. ............................. 280/7 A, 180/3 A
[51] Int. Cl. ............................................. B62d 57/00
[58] Field of Search .......................... 180/3 A, 7 A; 115/1 R

[56] References Cited
UNITED STATES PATENTS

| | | | |
|---|---|---|---|
| 2,376,647 | 5/1945 | Akins | 115/1 R |
| 1,289,808 | 12/1918 | Kennedy et al. | 115/1 R |
| 1,087,372 | 2/1914 | Hoines | 180/3 A |

*Primary Examiner*—Leo Friaglia
*Assistant Examiner*—Randall A. Schrecengost
*Attorney*—Keith L. Zerschling et al.

[57] ABSTRACT

A split torque gearing arrangement for use in a multiple wheel vehicle comprising four bevel torque delivery gears, one of which serves as a torque input gear, each of the other bevel gears serving as output gears, said gears including an internal clutch structure for selectively establishing a driving connection between the input gear and one of the output gears while the other two output gears are inactive and for clutching the input shaft to each of the output gears for split torque delivery, spaced bearing means for journalling the output gears and for accommodating gear tooth reaction torque and means for adjusting the bearing means to establish proper clearances between meshing gear teeth and for maintaining a desired preload on the bearing elements.

3 Claims, 2 Drawing Figures

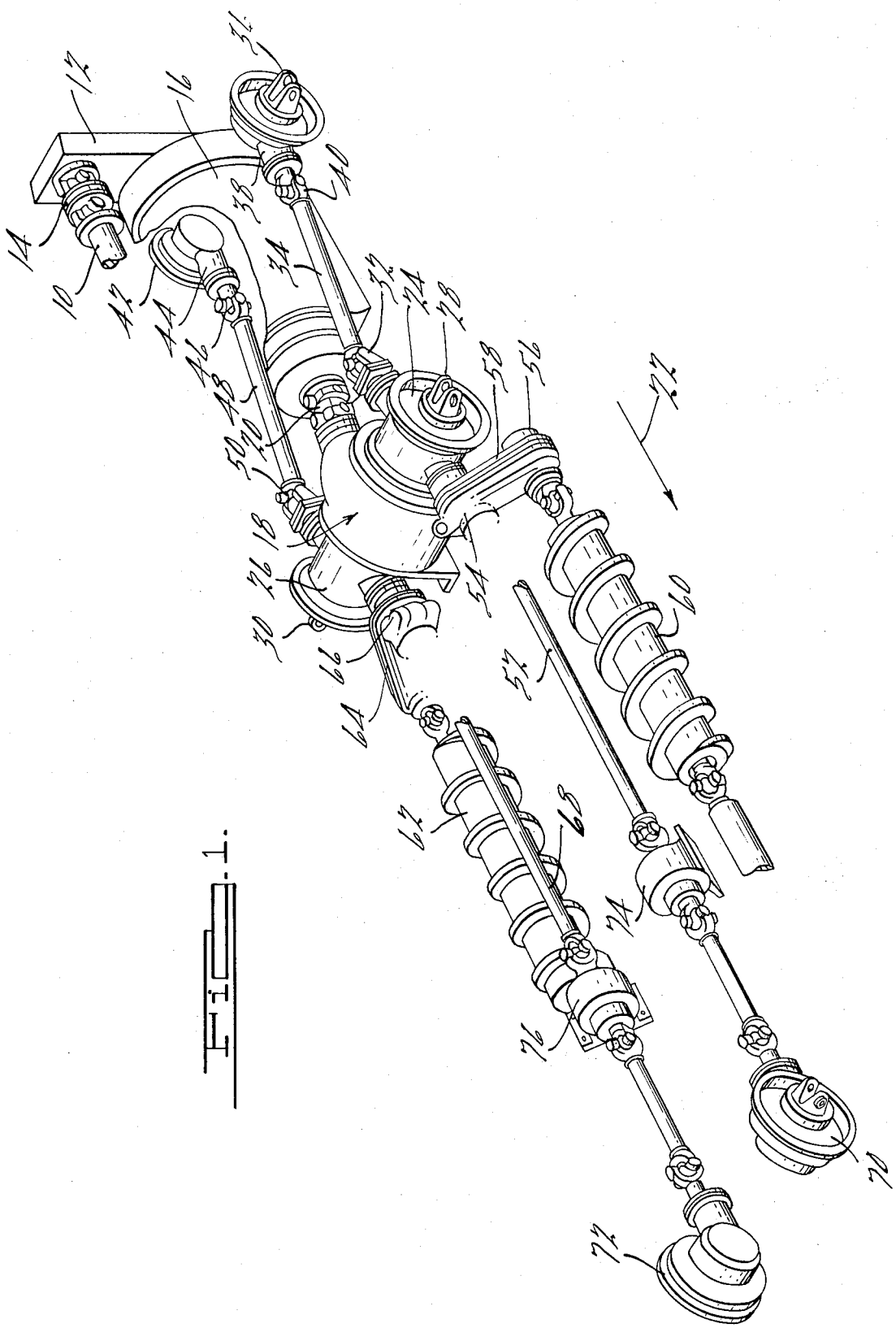

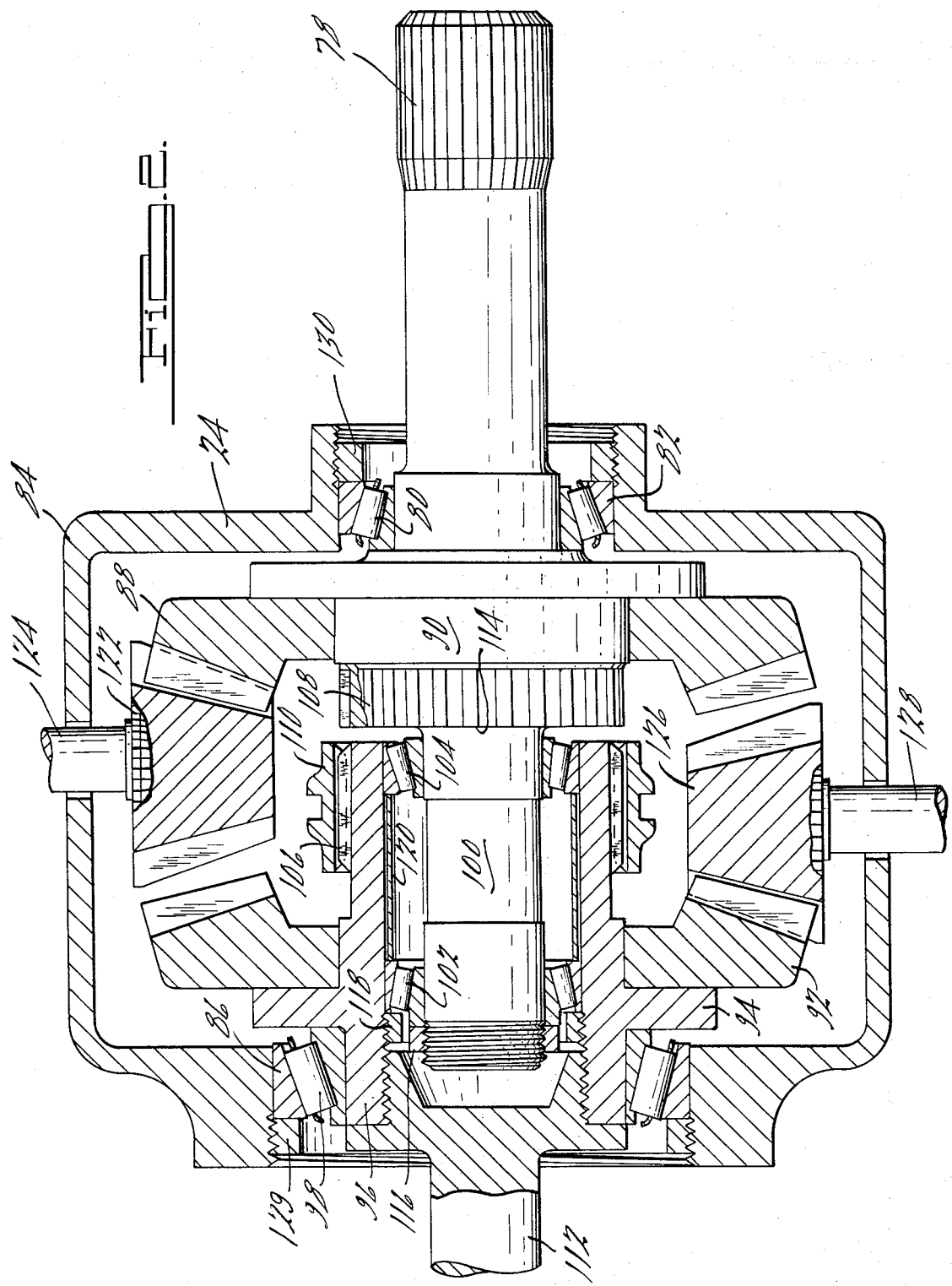

SPLIT TORQUE DRIVETRAIN FOR MULTIPLE WHEEL VEHICLE

GENERAL DESCRIPTION OF THE INVENTION

My invention is adapted especially to be used in split torque delivery drivelines for heavy vehicles having multiple traction axles. One heavy vehicle driveline capable of embodying the improvements of my invention includes a pair of rearward traction wheels, a pair of intermediate traction wheels and a pair of front wheels which may be used under some driving conditions as driving wheels but which function primarily as dirigible road wheels for accomplishing turning maneuvers. The engine in the disclosed vehicle driveline is mounted rearwardly over the rear traction wheels.

A multiple speed ratio transmission connects drivably the torque output shaft of the engine, which may be a diesel engine, to the input torque element of a right angle drive mechanism. Torque is delivered transversely of the principal vehicle axis to either intermediate traction wheel through a right angle drive mechanism. An intermediate traction wheel is connected to an output gear element of my improved split torque gearing, and the input element thereof is connected to an output shaft of the right angle drive gearing. A second output gear element of my split torque gearing is connected through a driveshaft and universal joint arrangement to one of the rear traction wheels. A companion split torque gearing mechanism of my invention is mounted on the opposite side of the right angle drive gearing for receiving the balance of the driving power delivered by the multiple ratio transmission. A first output element of the second split torque gearing arrangement is connected to the other intermediate traction wheel and a second output element thereof is connected to the other rear traction wheel.

Each of the front wheels is adapted to be connected to the third output gear of a separate one of the split torque gearing mechanisms.

When the clutch mechanism is disengaged, torque delivery to the rear wheels and the intermediate wheels is interrupted. When the clutch mechanism is applied, torque is delivered to each of the output gear elements.

Vehicle propelling mud screws are situated on opposed sides of the vehicle and extend longitudinally for rotation about axes that are parallel to the direction of motion of the vehicle. Each mud screw is connected to the third output gear element on the separate one of the split torque gearing arrangements of my invention. A torque transfer drive chain is used for establishing the driving connections between dried screws and the third output gear elements. Such chain drives may be actuated and deactivated by driver operating control mechanisms. When the vehicle propelling mud screws are active, the clutch structure which forms a part of my improved split torque gearing arrangement is disengaged thereby interrupting torque delivery to the rear wheels and the intermediate wheel so that a greater proportion of the engine horsepower will be delivered to the mud screws for vehicle purposes. The valves from the torque which is delivered to the front wheels maintains rotation of the front wheels so that the rolling velocity of the front wheels corresponds to the linear velocity component of the mud screw. The rotation of the front wheels during operation of the mud screws makes it possible to maintain directional control of the vehicle.

The bevel gear elements of the split torque gearing arrangement of my invention are journalled within a stationary housing by a four-point tapered roller bearing arrangement. The bearings may be adjusted and preloaded to maintain a proper meshing relationship between the individual gear element and for maintaining a desired bearing preload. The bearing arrangement is capable also of establishing a reaction torque for compensating for unbalanced gear loads.

BRIEF DESCRIPTION OF THE FIGURES OF THE DRAWINGS

FIG. 1 shows in isometric form the vehicle driveline components for a heavy duty multiple purpose vehicle capable of both road and off the road operation.

FIG. 2 is a split torque gearing arrangement capable of being used in the driveline of FIG. 1.

PARTICULAR DESCRIPTION OF THE INVENTION

In FIG. 1 reference character 10 designates one end of a diesel engine shaft connected to a torque input element of a torque transfer gear case 12 by means of a double universal joint 14. The output element of the torque transfer gear case 12 is connected to a torque input shaft of a multiple ratio power transmission mechanism 16. Preferably the transmission mechanism 16 is capable of providing either four or five forward driving speed ratios on either one reverse ratio or two reverse ratios. The power output shaft for the transmission mechanism 16 is connected to the torque input element of a right angle drive transmission 18, a double universal joint 20 being provided for this purpose.

The right angle drive 18 has two output shafts, one extending in each axial direction with respect to the direction of motion of the vehicle. The direction of motion is indicated by the directional arrow 22. Each output shaft is connected to the input gear element of a split torque gearing arrangement embodying the improvements of my invention. One gearing arrangement is indicated by reference character 24 and the other is indicated by reference character 26. One output gear element of the split torque gearing arrangement 24 is connected to a universal joint shown in part at 28 which in turn delivers torque through a driveshaft to an intermediate traction wheel. The output element for the gearing arrangement 26 is connected to the universal joint shown in part at 30, which in turn is coupled through a driveshaft to the other intermediate drive wheel. A second torque output gear element of the gearing arrangement 24 is connected through universal joint 32 and driveshaft 34 to rear traction wheel 36. The connection between the rear traction wheel and the adjacent end of the driveshaft 34 is effected by a right angle drive 38 and another universal joint 40. The corresponding torque delivery path for the opposite rear traction wheel 42 is defined by right angle drive 44, universal joint 46, driveshaft 48 and universal joint 50, the latter being connected drivably to an output element of the split torque gearing arrangement 26.

A third output element of the gearing arrangement 24 is connected to driveshaft 52. A selectively engageable synchronizer clutch located at 54 is adapted to establish a driving connection between shaft 52 and the drive sprocket 56. The torque delivery path between clutch 54 and sprocket 56 is effected by a chain drive located at 58.

Drive sprocket 56 powers a mud screw 60 having externally situated helical threads that are adapted to engage the muddy terrain or the surface of the swamp through which the vehicle is maneuvered when the traction wheels are encapable of supporting the weight of the vehicle. A corresponding driving connection is established on the opposte side of the vehicle between a second mud screw 62. This driving connection is defined by drive chain 64 and a second synchronizer clutch mechanism 66 which establishes a driving connection beetweeen drive chain 64 and the third output gear element of gearing arrangement 26.

Driveshaft 68 is connected drivably to the remaining output gear element of the gearing arrangment 26. Each driveshaft 52 and 68 is connected to a separate one of the front road wheels as shown at 70 and 72 respectively. If desired, an overrunning clutch may be exposed between the shaft 52 and the road wheel 70 and between the driveshaft 68 and the road wheel 72. These clutches are shown at 74 and 76, respectively.

During normal over-the-road operation of the vehicle, the rolling diameter of the front and intermediate driving wheels may be made slightly larger than the rolling diameter of the rear road wheel. This can be done by reducing the air pressure in the pneumatic tires for the front and intermediate road wheels relative to the pneumatic pressure in the driving traction wheels at the rear of the vehicle. In these circumstances the overrunning clutches 74 and 76 will overrun and no torque will be delivered through the driveshafts 52 and 68. All of the unused torque then will be delivered to the rear traction wheels. If the overrunning clutches 74 and 76 are not used, driving torque is delivered at all times to the forward wheels.

If the vehicle is operated off-the-road in swampy territory or in mud, it is possible that the weight of the vehicle will prevent normal road traction. In these circumstances the drive screws 60 and 62 may be actuated by engaging the clutches shown at 54 and 66. Driving torque of the engine then is delivered to the drive screws in order to provide adequate torque delivery to the drive screws. It is desirable, but not necessary, to disengage the intermediate and rear wheels. This is accomplished by disengaging the clutch mechanism which forms a part of the gearing arrangements 24 and 26.

I have shown in FIG. 2, in generally schematic form, the principal components of gearing arrangment 24. The gearing arrangement 26 is identical to the gearing arrangement 24, and for this reason only the latter will be described.

The input shaft 78 for the gearing arrangement 24 is journalled by means of tapered roller bearings 80 within bearing opening 82 formed in the stationary housing 84. The housing 84 encloses the gearing elements of the gearing arrangement 24, and it is provided with a second bearing opening 86. A first bevel ring gear 88 is secured to hub 90, which is joined to or formed integrally with the input shaft 78.

A second bevel gear is connected to gear hub 94 which in turn is joined to or formed integrally with sleeve shaft 96. Sleeve shaft 86 is journalled by means of tapered roller bearing 98 within the bearing opening 86.

A shaft extension 100 carried by the hub 90 extends within sleeve 96. Sleeve 96 is journalled on the extension 100 by spaced tapered roller bearings 102 and 104. External spline clutch teeth 106 are formed on the outer periphery of the sleeve 96 at one end thereof. These are aligned with external clutch teeth 108 formed on the hub 90. Clutch sleeve 110, having internal teeth, mesh with teeth 106. Sleeve 110 may be shifted in a right hand direction as viewed in FIG. 2 so that its internal teeth drivably engage teeth 108 thereby establishing a positive driving connection between shaft 78 and output shaft 112, through the sleeve 96. Shaft 112 is connected to one intermedaite traction wheel through universal joint 28.

Inner race for bearing 104 engages shoulder 114 formed on the hub 90. The inner race for the bearing 102 engages adjusting nut 116, which is threaded on the end of shaft 100. The outer race for bearing 102 is engaged by externally threaded adjusting nut 118, which is received within internal threads formed in the sleeve 96.

A spacer sleeve 120 is disposed between the outer race for bearing 102 and the outer race for bearing 104.

Output gear 122, which serves as a torque input element for synchronizer clutch 54, is a bevel pinion which engages drivably the ring gear 88. It is journalled for rotation about the axis of shaft 124 within the housing 84. Gear 122 meshes with gear 88 but it is not engaged with gear 92.

Output gear 126, which is in the form of a bevel pinion, is connected drivably to driveshaft 34 through the universal joint 32. It meshes with gear 92 but it does not mesh with gear 88. It is adapted for rotation about the axis of the shaft 128 and is journalled within the housing 84. The axis of shaft 128 is displaced with respect to the axis of shaft 124 as indicated in FIG. 2.

The four-point spaced bearing arrangement of my improved split torque gear system adapts the gear system for high torque delivery with minimum deflections at the bearing points. When the clutch 110 is engaged, no relative motion occurs at the spaced roller bearings 104 and 102. These bearings, however, act at this time to accommodate the reaction torque couple that is introduced by reason of the gear tooth loading on the output gear 122 and 126. When the clutch 110 is disengaged, relative motion occurs between sleeve 96 and shaft extension 100, but the bearings still are capable of acting as spaced bearing points for resisting unbalanced force couples due to the gear tooth loading.

During assembly the ring gears 92 and 88 are mounted within the housing 84 and the spaced tapered roller bearings 98 and 80 are loaded by their respective adjusting nuts 129 and 130. The nuts 129 and 130 are adjusted until the bearings are snug. The externally threaded adjusting nut 118 then is adjusted together with the appropriate readjustment of nut 82 until the proper clearance exists at the mesh between the gear 122 and gear 88. After this adjustment is accomplished, gear 92 is adjusted relative to gear 126 by backing off nut 118 and appropriately readjusting nut 129. This final adjustment does not affect the meshing engagement between gears 122 and 88. Thus, each gear can be independently adjusted without affecting the adjustment of the other. After both adjustments are completed, adjusting nut 116 is tightened thereby establishing the proper preload on the bearings 102 and 104.

Having thus described the preferred form of my invention, what I claim and desire to secure by U.S. Letters Patent is:

1. A vehicle driveline having an engine, a power transmission mechanism and a right angle cross drive adapted to receive power from said transmission mechanism and to distribute to each of two transversely disposed shafts, a split torque delivery gearing arrangement comprising an input member connected to an output element of said cross drive, a housing having spaced coaxially arranged bearing openings, a first output shaft journalled in one bearing opening, an input shaft journalled in the other bearing opening, a first ring gear carried by said input shaft, a second ring gear drivably connected to said output shaft, a second output shaft and a third output shaft mounted for rotation about an axis transverse to the common axis of said first output shaft and said input shaft, said second and third output shafts being offset, one with respect to the other, second and third output gears connected to said second and third output shafts, respectively, a hub sleeve connected to said second ring gear and extending concentrically with respect to portions of said input shaft, spaced bearings disposed between said input shaft extension and said hub sleeve, a clutch hub connected to said first ring gear, clutch teeth formed on said sleeve in registry with said clutch hub, a clutch element adjustable in one direction or the other to establish a driving connection between said clutch hub and said sleeve when it is moved to one axial position and to disengage such connection when it is moved in the opposite axial direction, a vehicle propelling drive screw mounted on either transverse side of the vehicle, a torque transfer drive mechanism connecting drivably the second output shaft to one of said drive screws, disengageable clutch means for interrupting the driving connection between said second output shaft and the drive screw, and a torque delivery driveline between forward road wheels and said second output shaft, the first and third output shafts respectively being connected drivably to intermediate and rear vehicle traction wheels.

2. The combination as set forth in claim 1 wherein the spaced bearings for said input shaft extension in said sleeve comprises tapered roller bearings each having an inner race and an outer race, a sleeve interposed between said outer bearing races, the inner bearing race of one roller bearing engaging the hub of said first ring gear, an adjusting nut carried by said input shaft extension and engaging the inner race of the other roller bearing, a second adjusting nut threadably connected to said sleeve and engaging the outer bearing race for said second roller bearing whereby the operating clearances may be established at the meshing engagement of said first ring gear and said first output shaft.

3. The combination as set forth in claim 2 wherein the bearing for journalling rotatably the input shaft with respect to said housing is a third tapered roller bearing with an inner race and an outer race, the bearing for journalling said sleeve with respect to said housing comprising a fourth tapered roller bearing with an inner race and with an outer race, and adjusting nuts threadably connected to said housing and engageable with the outer races of said third and fourth roller bearings.

* * * * *